(12) United States Patent
DePaoli et al.

(10) Patent No.: US 8,920,622 B2
(45) Date of Patent: Dec. 30, 2014

(54) INCREASING ION SORPTION AND DESORPTION RATES OF CONDUCTIVE ELECTRODES

(75) Inventors: David William DePaoli, Knoxville, TN (US); James O. Kiggans, Jr., Oak Ridge, TN (US); Costas Tsouris, Oak Ridge, TN (US); William Bourcier, Livermore, CA (US); Robert Campbell, Rancho Murieta, CA (US); Richard T. Mayes, Knoxville, TN (US)

(73) Assignee: UT Battelle, LLC, Oak Ridge, TN (US)

( * ) Notice: Subject to any disclaimer, the term of this patent is extended or adjusted under 35 U.S.C. 154(b) by 124 days.

(21) Appl. No.: 13/234,641

(22) Filed: Sep. 16, 2011

(65) Prior Publication Data

US 2013/0068630 A1 Mar. 21, 2013

(51) Int. Cl.
*C02F 1/469* (2006.01)
*C25B 15/02* (2006.01)
*C02F 1/46* (2006.01)

(52) U.S. Cl.
CPC ............... *C25B 15/02* (2013.01); *C02F 1/4691* (2013.01); *C02F 1/4604* (2013.01); *C02F 2201/4613* (2013.01); *C02F 2201/46135* (2013.01); *C02F 2201/4616* (2013.01); *C02F 2209/005* (2013.01); *C02F 2209/05* (2013.01)
USPC ............................ 204/661; 204/450; 204/672

(58) Field of Classification Search
CPC ....... B01D 57/02; C02F 1/469; C02F 1/4604; C02F 2209/05; C25B 15/08; C25B 15/02

USPC ......... 204/232, 450, 600, 660, 661, 663, 672, 204/673
See application file for complete search history.

(56) References Cited

U.S. PATENT DOCUMENTS

| | | | |
|---|---|---|---|
| 3,893,900 A | 7/1975 | Teshima et al. | |
| 5,433,829 A | 7/1995 | Pool | |
| 5,476,481 A | 12/1995 | Schöondorf | |
| 5,595,645 A | 1/1997 | Barr | |
| 6,045,685 A * | 4/2000 | Fajt et al. | 205/701 |
| 6,124,592 A | 9/2000 | Spangler | |
| 6,390,302 B1 | 5/2002 | Abrarov et al. | |
| 6,789,679 B2 | 9/2004 | Abrarov et al. | |
| 7,847,243 B2 | 12/2010 | Makarov et al. | |
| 2003/0057107 A1* | 3/2003 | Igarashi | 205/742 |
| 2010/0059378 A1* | 3/2010 | Elson et al. | 204/520 |
| 2010/0102009 A1* | 4/2010 | Silva | 210/748.01 |
| 2010/0147700 A1* | 6/2010 | Field et al. | 205/687 |

OTHER PUBLICATIONS

Dr. Steven Dietz, "Improved Electrodes for Capacitive Deionization", TDA Research, Inc., Wheat Ridge, CO, Jan. 2004, pp. 1-15.

(Continued)

*Primary Examiner* — Keith Hendricks
*Assistant Examiner* — Steven A. Friday
(74) *Attorney, Agent, or Firm* — Brinks Gilson & Lione (57) ABSTRACT

An electrolyte system includes a reactor having a pair of electrodes that may sorb ions from an electrolyte. The electrolyte system also includes at least one power supply in electrical communication with the reactor. The at least one power supply may supply a DC signal and an AC signal to the pair of electrodes during sorption of the ions. In addition, the power supply may supply only the AC signal to the pair of electrodes during desorption of the ions.

8 Claims, 5 Drawing Sheets

(56) References Cited

OTHER PUBLICATIONS

Dr. Steven Dietz, "Improved Electrodes for Capacitive Deionization", Proceedings of the 2004 NSF Design, Service and Maunfacturing Grantees and Research Conference, Birmingham, AL, Jan. 2004, pp. 1-5.

F.B. Sillars, et al., "Ionic Liquid Electrolytes to Enhance Supercapacitor Performance", Department of Chemical and Process Engineering, University of Strathclyde, Scotland UK, May 2009.

Andreas Lab, Learn More About Supercapacitors, Dalhousie University, Faculty of Science, Department of Chemistry, Nova Scotia, Canda, http://chemistry.dal.ca/Faculty/Professors/Andreas%2C_Heather/Learn_More_About_Sup.php, Aug. 4, 2009.

* cited by examiner

INCREASING ION SORPTION AND DESORPTION RATES OF CONDUCTIVE ELECTRODES

GOVERNMENT INTEREST

The inventions were made with government support under Prime Contract No. DE-AC05-00OR22725 awarded by the U.S. Department of Energy. The government has certain rights in inventions.

TECHNICAL FIELD

This disclosure relates generally to electrolyte systems and more particularly to using an alternating current (AC) signal to enhance the sorption and desorption rates of electrodes in the electrolyte systems.

BACKGROUND

An electrolyte system may use electrodes to remove ions from an electrolyte. The electrolyte may contain positively-charged ions and negatively-charged ions. The electrodes may be charged so that one electrode has a positive charge and another electrode has a negative charge. When the electrodes are charged, the positively-charged ions are sorbed by the negatively-charged electrode, and the negatively-charged ions are sorbed by the positively-charged electrodes. An example electrolyte system is a desalination system, which uses charged electrodes to remove salt (NaCl) from water. When the salt is in the water, the salt may dissolve into positively-charged sodium ions ($Na^+_{(aq)}$) and negatively-charged chloride ions ($Cl^-_{(aq)}$). When the electrodes are charged, the positively-charged sodium ions are sorbed by the negatively-charged electrode, and the negatively-charged chloride ions are sorbed by the positively-charged electrode.

DETAILED DESCRIPTION

The disclosure describes the application of an alternating current (AC) signal to electrodes in an electrolyte system during sorption and/or desorption of ions from an electrolyte. The electrolyte may be disposed in between a pair of electrodes. In addition, the electrolyte may comprise positively-charged ions and/or negatively charged ions. The AC signal may be applied to the pair of electrodes, which generates an AC voltage potential between the electrodes. In addition, a DC signal may be applied to the pair of electrodes, which generates a DC voltage potential between the electrodes. When the AC signal and the DC signal are applied to the pair of electrodes, one of the electrodes may be positively charged and the other electrode may be negatively charged. When the pair of electrodes is charged with the AC signal and the DC signal, the positively-charged ions in the electrolyte may move toward the negatively-charged electrode and be sorbed by the negatively-charged electrode. Similarly, the negatively-charged ions may move toward the positively-charged electrode and be sorbed by the positively-charged electrode. When the DC signal is removed from the pair of electrodes, the electrodes are no longer charged and the sorbed ions may be desorbed by the electrodes and diffuse into the electrolyte.

The ions may be sorbed and/or desorbed by the electrodes without application of the AC signal to the electrodes. When the DC signal is applied to the electrodes without the AC signal being applied, one of the electrodes is positively charged and the other electrode is negatively charged. When the electrodes are charged with the DC signal, positively-charged ions in the electrolyte may diffuse from the electrolyte to the negatively-charged electrode and be sorbed by the negatively-charged electrode. Similarly, negatively-charged ions in the electrolyte may diffuse from the electrolyte to the positively-charged electrode and be sorbed by the positively-charged electrode. When application of the DC signal is removed from the electrodes, the ions may be desorbed by the electrodes and diffuse into the electrolyte.

The rate at which the ions are sorbed may be the sorption rate. The rate at which the ions are desorbed may be the desorption rate. When the AC signal is applied to the electrodes, the sorption and/or desorption rates may be higher than when the AC signal is not applied to the electrodes. When the electrodes are charged with the DC signal, the ions may accumulate at and/or near surfaces of the electrodes in order to counterbalance the charges of the electrodes. The electrodes may comprise a porous material and the ions may accumulate in and/or around the pores of the electrodes. When the electrodes are charged with the AC signal, the ions are subjected to an electric field that alternates in polarity, causing the ions to move in a back and forth manner. When subjected to the alternating electric field, the ions at the surfaces of the electrodes may bounce in and/or around the pores, causing the ions to move inside the pores faster, resulting in a higher sorption rate than if the ions were not subjected to the alternating electric field. Similarly, when application of the DC signal is removed from the electrodes, but application of the AC signal on the electrodes is maintained, the ions being desorbed by the electrodes may bounce in and/or around the pores due to the alternating electric field and diffuse from the electrodes into the electrolyte more quickly than when the AC signal is not applied to the electrodes.

The AC signal may be applied to any device or system that includes at least a pair of electrodes for sorption and/or desorption of ions from an electrolyte. A device that includes the porous electrodes may be a reactor. In one example, the reactor comprises a capacitive deionization reactor. Capacitive deionization may refer to a process of removing salt and/or minerals from water by applying an electric field in between the pair of electrodes. In another example, the reactor may comprise an electric double-layer capacitor (EDLC), which may also be referred to as a supercapacitor, supercondenser, pseudocapacitor, electrochemical double layer capacitor, or ultracapacitor. A DC signal and/or an AC signal may be applied to the electrodes and generate a DC voltage and/or an AC voltage between the electrodes. As a result, the electrodes may be positively-charged and negatively-charged. Charge is stored in the electrodes when positively-charged ions in the electrolyte become attracted and move toward the negatively-charged electrode, and negatively-charged ions in the electrolyte are attracted to and move toward the positively-charged electrode. When the electrodes become saturated or close to being saturated with the ions, application of the DC signal may be removed from the electrodes. The charge that is stored in the electrodes may be discharged from the electrodes and may be used to power an electronic device, may be dissipated as heat, or may be discharged to ground.

Figure 1:
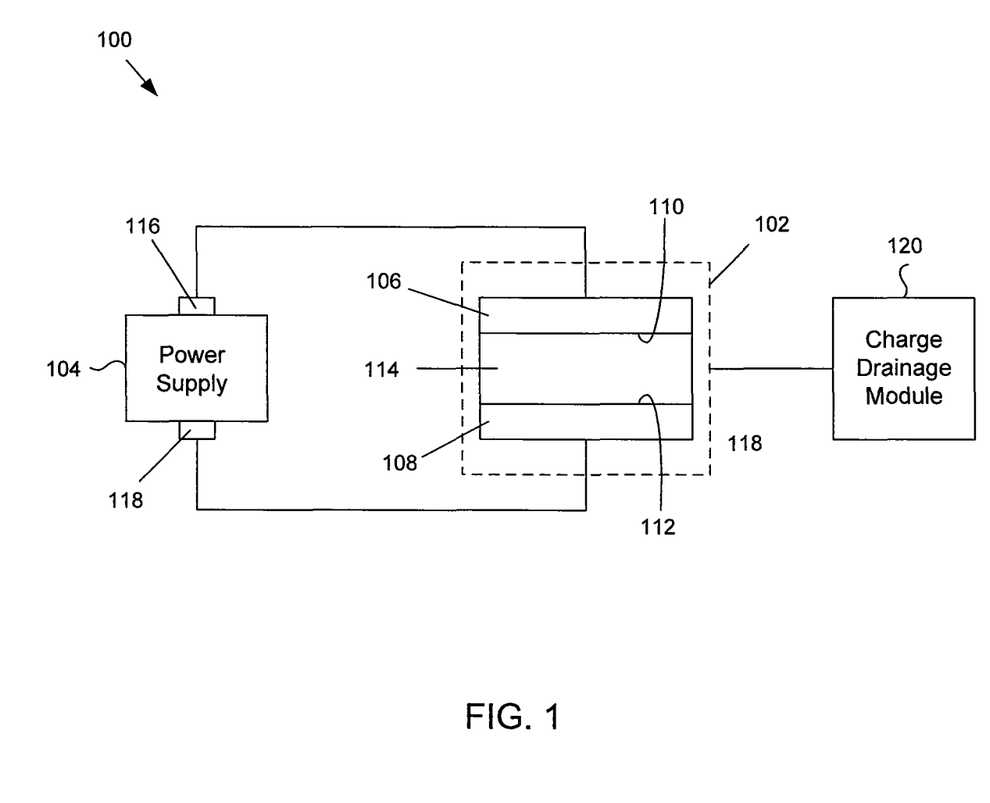
FIG. 1 shows a diagram of an example electrolyte system that may use an AC signal during sorption and/or desorption of ions.

FIG. 1 illustrates a diagram of an example electrolyte system 100 that may use an AC signal during sorption and/or desorption of ions. The electrolyte system 100 may include a reactor 102. The reactor 102 may include a pair of electrodes comprising a first electrode 106 and a second electrode 108. The electrodes 106, 108 may comprise a porous material that is capable of sorbing ions from an electrolyte. The porous material may comprise mesoporous carbon, microporous carbon, or nanoporous activated charcoal. Other conductive porous materials may be used. The first electrode 106 may include an inner surface 110 that faces an inner surface 112 of the second electrode 108. The electrodes 106, 108 may comprise an orientation that is perpendicular to the direction in which the inner surfaces 110, 112 face each other. As shown in FIG. 1, the electrodes 106, 108 are oriented horizontally such that the inner surface 110 faces the inner surface 112 in a vertical direction. Other orientations may be used. For example, the electrodes 106, 108 may be configured vertically such that the inner surfaces 110, 112 face each other in a horizontal direction.

The reactor 102 may further include a channel 114 disposed in between the electrodes 106, 108. The electrolyte may be disposed in the channel 114. The electrolyte may comprise any substance containing free ions. The free ions may be positively-charged and/or negatively-charged. The electrolyte may comprise an ionic solution. For example, the electrolyte may comprise an aqueous solution that contains positively-charged sodium ions ($Na^+_{(aq)}$) and/or negatively-charged chloride ions ($Cl^-_{(aq)}$). Alternatively, the electrolyte may comprise a molten or solid state.

The electrolyte system 100 may further include a power supply 104 that is in electrical communication with the reactor 102. The power supply 104 may supply a DC signal and an AC signal to the reactor 102. Alternatively, more than one supply 104 may be used. For example, one power supply may be used to supply the DC signal to the reactor 102 and a second power supply may be used to supply the AC signal to the reactor 102. As shown in FIG. 1, a positive terminal 116 of the power supply 104 may be connected to one of the electrodes (e.g., the first electrode 106), and positively charge the first electrode 106. In addition, a negative terminal 118 of the power supply 104 may be connected to the other electrode (e.g., the second electrode 108) and negatively charge the second electrode 108. When the electrodes 106, 108 are charged with the DC signal and the AC signal from the power supply 104, positively-charged ions in the channel 114 may diffuse toward and be sorbed by the negatively-charged second electrode 108. Similarly, when the electrodes 106, 108 are charged with the DC signal and the AC signal from the power supply 104, negatively-charged ions in the channel 114 may diffuse toward and be sorbed by the positively-charged first electrode 106. By charging the electrodes 106, 108 with the AC signal and the DC signal, the ions may be sorbed by the first electrode 106 and/or the second electrode 108 faster than if only the DC signal is used to charge the electrodes 106, 108.

The AC signal may comprise a peak voltage. In one example, the peak voltage, when combined with the voltage of the DC signal, is less than or equal to a threshold voltage of an electrochemical reaction in the electrolyte. For example, in an aqueous solution, a threshold voltage of approximately or about 1.4 volts may cause electrolysis in the aqueous solution. The combination of the voltage of the DC signal and the highest peak voltage of the AC signal may be less than or equal to the threshold voltage of 1.4 volts. In one example, the DC signal may be approximately or about 1.2 volts and the highest peak voltage of the AC signal may be approximately 100 mV. The combination of the 1.2 volts of the DC signal and the 100 mV highest peak voltage of the AC signal is 1.3 volts, which is less than or equal to the threshold voltage of 1.4 volts.

In addition, the AC signal may or may not include an offset. For example, the AC signal may not be offset, may be offset positively, or may be offset negatively. For example, the AC signal may be centered at 0 volts with equal but opposite peak voltages (e.g., +100 mV and −100 mV). Alternatively, the AC signal may be offset positively. As an example, the AC signal may be offset by 50 mV, having peak voltages at 0 volts and +100 mV. Alternatively, the AC signal may be offset negatively. As an example, the AC signal may be offset by −50 mV, and have peak voltages at −100 mV and 0 volts.

In each of the above examples, the highest peak voltage of the AC signal, when combined with the DC voltage of 1.2 volts, is less than or equal to the threshold voltage of 1.4 volts for electrolysis in the aqueous solution. The above examples are non-limiting and the DC signal and the AC signal may have other voltages. In addition, other electrochemical reactions may be caused in other electrolytes by other threshold voltages, and the values of the DC and AC voltages may depend on those threshold voltages.

In other examples, the peak voltage may be greater than the threshold voltage of the electrochemical reaction in the electrolyte. When the peak voltage exceeds the threshold voltage of the electrochemical reaction, the AC signal leads to an increase in the rate of the reaction. In one example, the DC voltage ranges from 0 to 10 volts and the AC peak voltage ranges from 0 to 5 volts. However, the DC and AC voltages may have other values. In one example, the frequency of the AC signal may be in the range from approximately 10 kHz to approximately 1 MHz. However, the AC signal may have other frequencies. In addition, the wave of the AC signal may be a sinusoidal wave, a square wave, a triangle wave, a sawtooth wave, or any other AC waveform that may be superimposed on the DC signal. In addition or alternatively, swept frequency modulation techniques may be used to generate the AC signal.

The frequency of the AC signal may vary. In general, the frequency of the AC signal is a frequency that improves the sorption rate and/or desorption rate of the electrodes 106, 108. For example, a frequency that is too low or too high may have an insignificant or no effect on the sorption rate and/or desorption rate of the electrodes 106, 108. The frequency may depend on many factors not limited to the size of the ions, the valence of the ions, the salinity of the fluid, and the temperature. Lower frequencies may be used for larger sized ions and higher frequencies may be used for smaller sized ions. In one example, the frequency of the AC signal may be in the range from approximately 10 kHz to approximately 1 MHz. However, the AC signal may have other frequencies. In addition, the wave of the AC signal may be a sinusoidal wave, a square wave, a triangle wave, a sawtooth wave, or any other AC waveform that may be superimposed on the DC signal.

The electrolyte system 100 may further include a charge drainage module 120. The charge drainage module 120 may remove charge stored in the electrodes 106, 108 due to sorption of the ions. In one example, the charge drainage module 120 provides a short circuit between the first electrode 106 and the second electrode 108 and the charge from the electrodes 106, 108 is discharged to a ground reference. In another example, the charge drainage module 120 comprises resistive circuitry and the charge is discharged from the electrodes 106, 108 and dissipated as heat through the resistive circuitry. In other examples, the charge drainage module 120 may be connected to a different reactor other than reactor 102, a different electrode or electrodes other than the first electrode 106 and/or the second electrode 108, or a cell of the reactor 102 or a cell of a different reactor other than a cell comprising the first electrode 106 and/or the second electrode 108 (not shown). The charge drainage module 120 may be configured to drain and/or recycle charge that was stored in the reactor 102 or a cell of the reactor 102. The charge drainage module 120 may switch between two states or positions to remove the charge. In a first state or position (e.g., an open position) the charge drainage module 120 may not remove the charge from the electrodes 106, 108. In a second state or position (e.g., a closed position), the charge drainage module 120 may remove the charge from the electrodes 106, 108. The charge drainage module 120 may include a switch that switches between the first state and the second state. The switch may be an electrical switch and be controlled using an electrical control signal. Alternatively, the switch may be a mechanical switch, such as a pushbutton or a lever, and be controlled by applying an external force to the switch.

Figure 2:
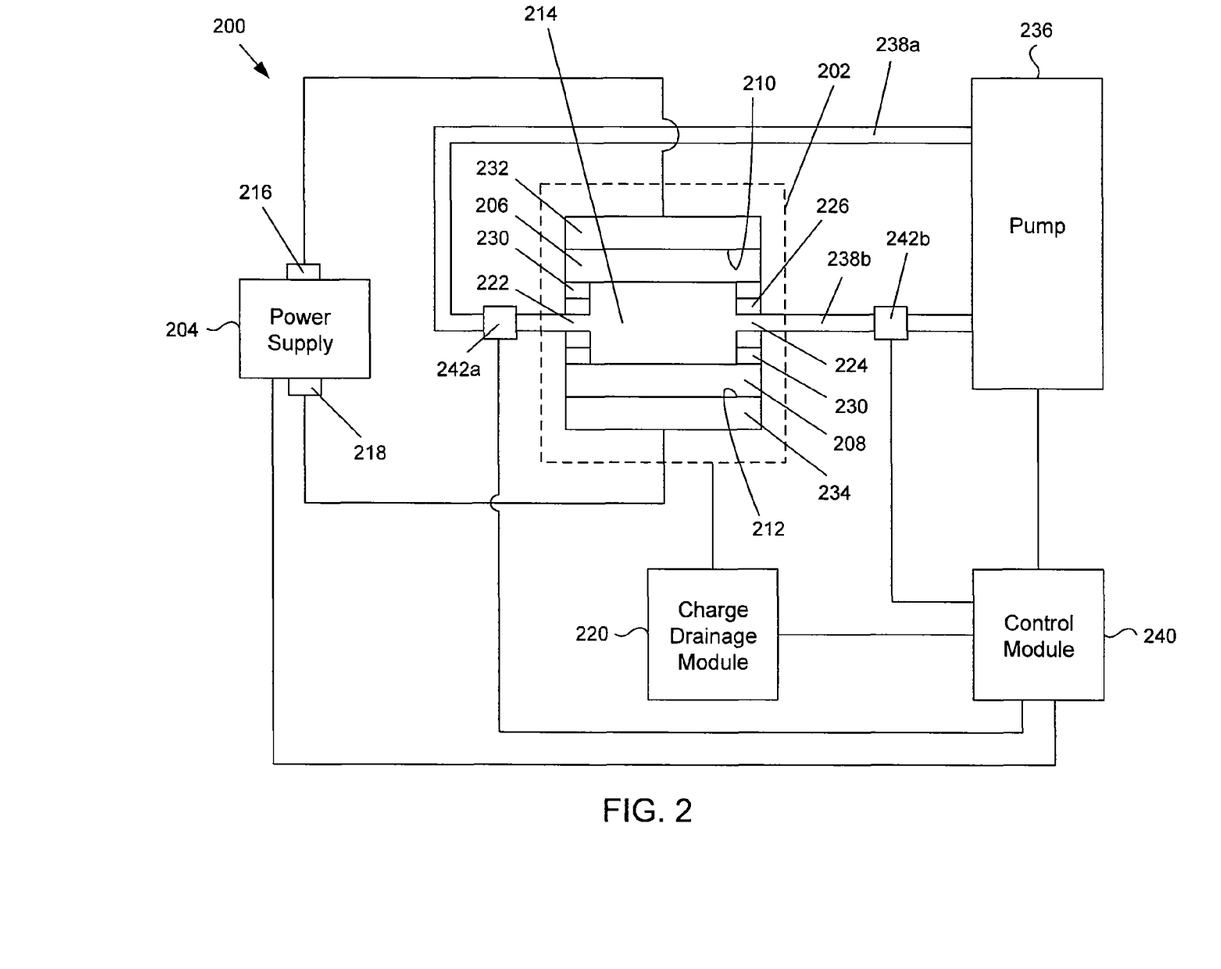
FIG. 2 shows a diagram of an alternative example electrolyte system that may use an AC signal during sorption and/or desorption of ions.

FIG. 2 illustrates a diagram of an alternative example electrolyte system 200 that may use an AC signal during sorption and/or desorption of ions. The electrolyte system 200 may be a capacitive deionization system. Capacitive deionization may be a process of removing salt and/or minerals from water by applying an electric field in between two electrodes of a reactor. The capacitive deionization system 200 may include a capacitive deionization reactor 202. The reactor 202 may include a pair of electrodes comprising a first electrode 206 and a second electrode 208. The electrodes 206, 208 may comprise a porous material that is capable of sorbing ions from an electrolyte, such as a mesoporous or a microporous carbon material. Other porous materials may be used. The first electrode 206 includes an inner surface 210 that faces an inner surface 212 of the second electrode 208. The electrodes 206, 208 may comprise an orientation that is perpendicular to the direction in which the inner surfaces 210, 212 face each other. As shown in FIG. 2, the electrodes 206, 208 are oriented horizontally such that the inner surface 210 faces the inner surface 212 in a vertical direction. Other orientations may be used. For example, the electrodes 206, 208 may be configured vertically such that the inner surfaces 210, 212 face each other in a horizontal direction.

The reactor 202 may further include a channel 214 disposed in between the electrodes 206, 208. An electrolyte may be disposed in the channel 214. Alternatively or in addition, the electrolyte may pass through the channel 214. The electrolyte may be injected into the channel 214 by injecting the electrolyte through an input port 222 of the reactor 202. Alternatively or in addition, the electrolyte may be removed from the channel 214 by removing the electrolyte through an output port 224. The electrolyte may comprise any substance containing free ions. The free ions may be positively-charged and/or negatively-charged. The electrolyte may comprise an ionic solution. For example, the electrolyte may comprise an aqueous solution that contains positively-charged ions, such as sodium ions ($Na^+_{(aq)}$), and/or negatively-charged ions, such as chloride ions ($Cl^-_{(aq)}$).

The reactor 202 may include a spacer layer 226 disposed in between the electrodes 206, 208. The spacer layer 226 may include a hollow portion that comprises the channel 214. The spacer layer may further include sides that border the hollow portion and that form the side walls of the channel 214. One or more of the sides may include the input port 222 and/or the output port 224. However, other configurations may be used. For example, the input port 222 and/or the output port 224 may be disposed above or below the sides. The spacer layer may comprise a transparent thermoplastic such as polymethyl methacrylate (i.e., Plexiglas®). Other materials may be used. In addition, a sealant 230 may be disposed in between the spacing layer 226 and the first electrode 206 and/or in between the spacing layer 226 and the second electrode 208. The sealant 230 may prevent the electroylte from leaking out of the reactor 202 when the electrolyte is in the channel 214. In one example, the sealant 230 is a gasket sealant. However, other sealants may be used, such as an acrylic sealant, an epoxy sealant, an adhesive sealant, a polyurethane sealant, a rubber sealant, or a silicone sealant.

The reactor 202 may further include a pair of current collector plates comprising a first current collector plate 232 and a second current collector plate 234. The first current collector plate 232 may be in connection with the first electrode 206. The second current collector plate 234 may be in connection with the second electrode 208. As shown in FIG. 2, the first current collector plate 232 may be in connection with the first electrode 206 at a side of the first electrode 206 that is opposite the inner surface 210 of the first electrode 206. Similarly, the second current collector plate 234 may be in connection with the second electrode 208 at a side of the second electrode 208 that is opposite the inner surface 212 of the second electrode 208. Alternatively, the first current collector plate 232 may be connected to the first electrode 206 at other locations of the first electrode 206, such as the inner surface 210 or sides of the first electrode 206 that are adjacent to the inner surface 210. Likewise, the second current collector plate 234 may be connected to the second electrode 208 at other locations of the second electrode 208, such as the inner surface 212 or sides of the second electrode 208 that are adjacent to the inner surface 212.

When the first current collector plate 232 is connected to the first electrode 206, the first current collector plate 232 may be in electrical communication with the first electrode 206. Similarly, when the second current collector plate 234 is connected to the second electrode 208, the second current collector plate 234 may be in electrical communication with the second electrode 208. The first current collector plate 232 and/or the second current collector plate 234 may receive a DC signal and/or an AC signal and communicate the DC signal and/or the AC signal to the first electrode 206 and/or the second electrode 208.

The first and second current collector plates 232, 234 may be made of an electrically conductive material or semiconductive material. In one example the first and/or second current collector plates 232, 234 comprise graphite. However, other materials may be used. The first current collector plate 232 and/or the second current collector plate 234 may provide structure and support to the first electrode 206 and/or the second electrode 208. Alternatively or in addition, the first current collector plate 232 and/or the second current collector plate 234 may provide a better electrical connection with the source of power from which the reactor 202 is receiving the DC signal and/or the AC signal than if the power supply is connected directly to the electrodes 206, 208. In an alternative capacitive deionization reactor 202, the first current collector plate 232 and/or the second current collector plate 234 are not included, and the power source may be directly connected to the first electrode 206 and/or the second electrode 208.

The capacitive deionization system 200 may further include a power supply 204 that is in electrical communication with the capacitive deionization reactor 202. The power supply 204 may supply a DC signal and an AC signal to the capacitive deionization reactor 202. Alternatively, more than one supply 204 may be used. For example, one power supply may be used to supply the DC signal to the capacitive deionization reactor 202 and a second power supply may be used to supply the AC signal to the capacitive deionization reactor 202. As shown in FIG. 2, a positive terminal 216 of the power supply 204 may be connected to one of the electrodes (e.g., electrode 206), and positively charge the electrode 206. In addition, a negative terminal 218 of the power supply 204 may be connected to the other electrode (e.g., electrode 208) and negatively charge the electrode 208. When the electrodes 206, 208 are charged with the DC signal and the AC signal from the power supply 204, positively-charged ions in the channel 214 may diffuse toward and be sorbed by the negatively-charged electrode 208. Similarly, when the electrodes 206, 208 are charged with the DC signal and the AC signal from the power supply 204, negatively-charged ions in the channel 214 may diffuse toward and be sorbed by the positively-charged electrode 206. By charging the electrodes 206, 208 with the AC signal and the DC signal, the ions may be sorbed by the electrode 206 and/or the electrode 208 faster than when only the DC signal is used.

The capacitive deionization system 200 may further include a pump 236 that is connected to the capacitive deionization reactor 202. The pump 236 may be configured to pump liquid into the capacitive deionization reactor 202 and/or pump liquid out of the capacitive deionization reactor 202. For example, the pump 236 may be configured to pump an ionic solution, such as water containing positively-charged ions (e.g., $Na^+_{(aq)}$)), and/or negatively-charged ions (e.g., $Cl^-_{(aq)}$)), into the deionization capacitive reactor 202. In addition or alternatively, the pump 236 may be configured to pump a deionized solution out of the capacitive deionization reactor 202. A deionized solution may be a solution that had free ions that were sorbed by the pair of electrodes 206, 208. In addition or alternatively, the pump 236 may be configured to pump out of the capacitive deionization reactor 202 a concentrated ionic solution. A concentrated ionic solution may be an ionic solution containing ions that desorbed from the pair of electrodes 206, 208 after application of a DC voltage and/or an AC voltage was removed from the electrodes 206, 208.

The pump 236 may be connected to the capacitive deionization reactor 202 using one or more fluid transfer members 238. The fluid transfer members 238 may be a flexible or inflexible hose, pipe, or any other tubular member that may transport an ionic solution from the pump 236 to the capacitive deionization reactor 202 or from the deionization reactor 202 to the pump 236. Fluid transport member 238a may be connected to an output port of the pump 236 and the input port 222 and the ionic solution may flow from the pump 236 to the input port 222 and flow into the channel 214. Alternatively or in addition, fluid transport member 238b may be connected to an input port of the pump 236 and the output port 222 and the ionic solution may flow out of the channel 214 and into the pump 236.

The pump 236 and/or the fluid transfer members 238 may be in electrical communication with a control module 240. The control module 240 may determine and/or set one or more flow rates at which liquid, such as the ionic solution and/or the deionized solution, may be pumped into the capacitive deionization reactor 202 and/or pumped out of the capacitive deionization reactor 202. The control module 240 may control the pump 236 to transfer the liquid at the determined flow rate. In addition, the control module 240 may be in electrical communication with one or more probes 242. The probes 242 may measure or sense the conductivity of the liquid flowing into and/or out of the capacitive deionization reactor 202. For example, probe 242a may measure the conductivity of the liquid flowing into the capacitive deionization reactor 202 and probe 242b may measure the conductivity of the liquid flowing out of the capacitive dionization reactor 202. Alternatively, only one probe may be used. For example, the capacitive deionization system 200 may include only probe 242a to measure the conductivity of the liquid flowing into the reactor 202 or include only probe 242b to measure the conductivity of the liquid flowing out of the reactor 202.

The control module 240 may be connected to probe 242a and/or probe 242b and determine the conductivity of the liquid measured at probe 242a and/or probe 242b. In addition, the control module 240 may determine the conductivity measured at probe 242a and/or probe 242b at set time-intervals and determine the conductivity over time. Based on the conductivity, the control module 240 may determine the amount of ions that are sorbed, desorbed, sorption rates, and/or desorption rates. The conductivity of the liquid flowing into and/or out of the capacitive deionization reactor 202 may be proportional to the amount of ions that are sorbed and/or desorbed by the electrodes 206, 208 and/or the sorption rates and/or desorption rates at which the ions are being sorbed and/or desorbed by the electrodes 206, 208. For example, when the DC signal and/or the AC signal is applied to the electrodes 206, 208 and ions are being sorbed by the first electrode 206 and/or the second electrode 208, the lower the conductivity that is measured at probe 242b may indicate a higher amount of ions that were sorbed by the first electrode 206 and/or the second electrode 208 as the ionic solution passes through the channel 214. Similarly, the greater the conductivity level measured at probe 242b decreases over a time interval, the greater the sorption rate at which the ions are being sorbed by the first electrode 206 and/or the second electrode 208. In addition or alternatively, when the application of the DC signal is removed from the electrodes 206, 208 and ions are being desorbed by the first electrode 206 and/or the second electrode 208 and diffusing into channel 214, the higher the conductivity measured at probe 242b, the greater the amount of ions that were desorbed by the first electrode 206 and/or the second electrode 208. Similarly, the greater the conductivity level measured at probe 242b increases over a time interval, the greater the desorption rate at which the ions are being desorbed by the first electrode 206 and/or the second electrode 208.

Alternatively or in addition, the control module 240 may determine a difference in conductivity measured between probe 242a and probe 242b and/or a difference in conductivity over a time interval measured between probe 242a and probe 242b. Based on the difference in conductivity measured between probe 242a and probe 242b, the control module may determine the amount of ions that are sorbed and/or desorbed and/or sorption rates and/or desorption rates. The difference in conductivity may be proportional to the sorption and/or desorption of the ions by the first electrode 206 and/or the second electrode 208 and/or the sorption rate and/or the desorption rate at which the ions are sorbed and/or desorbed by the first electrode 206 and/or the second electrode 208. For example, when the DC signal and/or the AC signal is applied to the electrodes 206, 208, the greater the difference in measured conductivity between probe 242a and 242b (i.e., the lower the conductivity of the liquid flowing out of the capacitive deionization reactor 202 compared to the conductivity of the liquid flowing into the capacitive deionization reactor 202), may indicate a greater sorption of ions by the first electrode 206 and/or the second electrode 208. Similarly, a negligible difference or no difference in measured conductivity between probe 242a and 242b may indicate that no electrons are being sorbed by the first electrode 206 and/or the second electrode 208 and the first electrode 206 and/or the second electrode 208 are fully saturated.

As shown in FIG. 2, the control module 240 may also be in electrical communication with the power supply 204. The control module 240 may be configured to turn off and/or turn on the DC signal and/or the AC signal that is generated and output by the power supply 204. The control module 240 may determine to turn off and/or turn on the power supply based on the conductivity, the difference in conductivity, the sorption of ions, the desorption of ions, the sorption rates, and/or the desorption rates that are determined. The control module 240 may determine and/or set a threshold value that is indicative of a threshold sorption amount, a threshold desorption amount, a threshold sorption rate, and/or a threshold desorption rate. If the determined conductivity, difference in conductivity, sorption of ions, desorption of ions, sorption rate, and/or desorption rate meets, exceeds or falls below the threshold value, the control module 240 may be configured to turn on or turn off the power supply 204. For example, the control module 240 may determine and/or set a threshold value that is indicative of a change in conductivity of water flowing out of the capacitive deionization reactor 202. The change in conductivity may be proportional to a sorption rate. Where the DC signal and the AC signal is applied to the electrodes 206, 208, if the conductivity measured at probe 242b meets or exceeds the threshold value, the control module 240 may determine that the first electrode 206 and/or the second electrode 208 is at a saturation level and turn off the DC signal that is being generated from the power supply 204. In addition, the control module 240 may determine to keep on the AC signal even though the DC signal is turned off. Alternatively, the control module 240 may turn off both the AC signal and the DC signal.

The control module 240 may also control the pump 236 based on the threshold value. For example, when the control module 240 determines that the conductivity measured at probe 242b meets or exceeds the threshold value, the control module 240 may turn off the liquid that is being pumped out of the pump 236 and into the capacitive deionization reactor 202. Alternatively, or in addition, the control module 240 may determine the location to which the liquid being pumped out of the capacitive deionization reactor 202 is being pumped. For example, where the DC signal and/or the AC signal is being applied to the electrodes 206, 208, the control module 240 may direct the deionized solution (i.e., the solution where the ions are being sorbed by the electrodes 206, 208) to be pumped into a first chamber or reservoir in the pump 236. Alternatively, the first chamber may be located external to the pump 236 or external to the capacitive deionization system 200. Where application of the DC signal is removed from the electrodes 206, 208, the control module may direct the concentrated solution (i.e., the solution where the ions are desorbed by the electrons and diffused into the solution) into a second chamber or reservoir in the pump 236. Alternatively, the second chamber may be located external to the pump 236 or external to the capacitive deionization system 200. In addition, the control module 240 may determine whether all or less than all of the concentrated solution has been pumped out of the capacitive deionization reactor 202. The control module 240 may communicate with the power supply 204 to turn on the DC power supply after determining that all or less than all of the concentrated solution has been pumped out of the capacitive deionization reactor 202. Alternatively or in addition, the control module may activate the pump 236 to pump the ionic solution from the pump 236 to the capacitive deionization reactor 202 after determining that all or less than all of the concentrated solution has been pumped out of the capacitive deionization reactor 202.

The capacitive deionization system 200 may further include a charge drainage module 220. The charge drainage module 220 may remove charge stored in the electrodes 206, 208 due to sorption of the ions. In one example, the charge drainage module 220 provides a short circuit between the first electrode 206 and the second electrode 208 and the charge from the electrodes 206, 208 is discharged to a ground reference. In another example, the charge drainage module 220 comprises resistive circuitry and the charge is discharged from the electrodes 206, 208 and dissipated as heat through the resistive circuitry. The charge drainage module 220 may switch between two states or positions to remove the charge. In a first state or position (e.g., an open position) the charge drainage module 220 may not remove the charge from the electrodes 206, 208. In a second state or position (e.g., a closed position), the charge drainage module 220 may remove the charge from the electrodes 206, 208. The charge drainage module 220 may include a switch that switches between the first state and the second state. Other configurations that remove the charge stored in the electrodes 206, 208 may be used. To remove the charge from the electrodes 206, 208, the charge drainage module 220 may be in electrical communication with the pair of electrodes 206, 208. In addition, the charge drainage module 220 may be in electrical communication with the control module 240. The control module 240 may control operation of the charge drainage module. For example, the control module 240 may send a first signal to the charge drainage module 220 that configures the charge drainage module 220 in the first (e.g., open) position such that the charge may not be discharged from the electrodes 206, 208. In addition, the control module 240 may send a second signal to the charge drainage module 220 that configures the charge drainage module 220 in the second (e.g., closed) position such that the charge may be discharged from the electrodes 206, 208.

The control module 240 may send the second signal after the control module determines that a measured conductivity has met or exceeded the threshold value. For example, when the DC signal and/or the AC signal is being applied to the electrodes 206, 208, the charge drainage module 220 may be in the first position and the charge may be stored in the electrodes 206, 208. After the control module 240 determines that a measured conductivity has met or exceeded the threshold value, the control module 240 may send the second signal to the charge drainage module 220 and the charge may be discharged from the electrodes 206, 208. The control module may send the second signal after the control module 240 communicates with the power supply 204 to turn off the DC signal. In addition or alternatively, the control module 240 may send the first signal to the charge drainage module 220 after the concentrated solution is pumped out of the capacitive deionization reactor 202.

Although only one control module 240 is described with reference to FIG. 2, an alternative capacitive deionization system 200 may include more than one control module. For example, one or more control modules may be electrical communication with the pump 236, one or more control modules may be in communication with the probes 242, one or more control modules may be in communication with the power supply 204, and/or one or more control modulates may be in communication with the charge drainage module 220. Alternatively or in addition, the one or more control modules may include or be in electrical communication with one or more processors in communication with one or more memory devices. The one or more processors in communication with the one or more memory devices may process and/or store information that is used or received by the one or more control modules.

The capacitive deionization system 200 shown in FIG. 2 includes a capacitive deionization reactor 202 that comprises a single cell, where a single cell refers to a reactor having a single pair of electrodes. In alternative capacitive deionization systems, the capacitive deionization reactor 202 may include a cell that has more than two electrodes. The polarities of successive electrodes may alternate when the DC signal and/or the AC signal is applied to the electrodes. For example, if the cell of the capacitive deionization reactor includes four electrodes, the first and third electrodes comprise one polarity (e.g., a positive polarity) and the second and fourth electrodes comprise another polarity (e.g., a negative polarity). Alternatively, the capacitive deionization system may include more than one cell. The ionic solution may be pumped through several cells before being sent to an end destination. The capacitive deionization system may comprise a large-scale system, such as a desalination plant or a desalination system used on a seagoing ship or a submarine. The large-scale desalination plant or system may include at least one power source that generates one or more AC signals and supplies the AC signals to the electrodes in the desalination plant or system.

Figure 3:
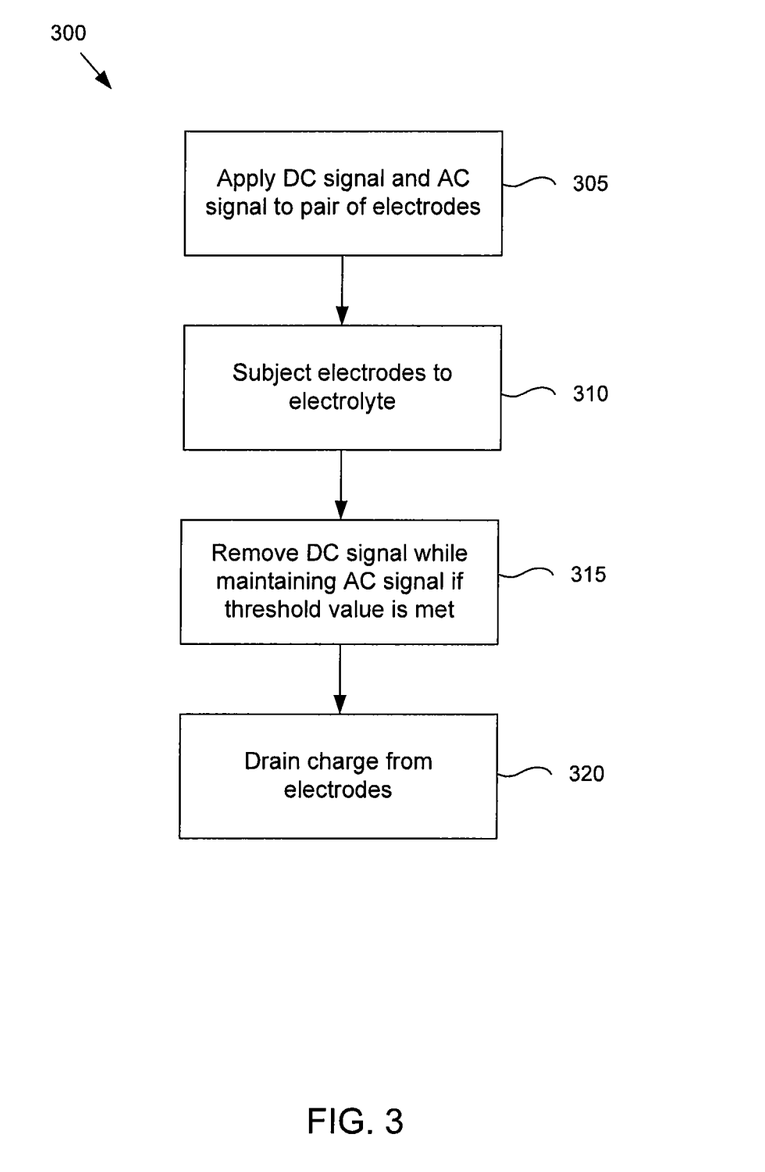
FIG. 3 shows an example method 300 of applying an AC signal to electrodes during sorption and/or desorption of ions in an electrolyte system.

FIG. 3 shows an example method 300 of applying an AC signal to electrodes during sorption and/or desorption of ions. The method may be used in conjunction with the electrolyte system 100 and/or the capacitive deionization system 200 described above. At block 305, a DC signal and an AC signal may be applied to a pair of electrodes. A sum of a voltage of the DC signal and a highest voltage of the AC voltage signal may be less than or equal to a threshold voltage of a chemical reaction associated with an electrolyte. In one example, the chemical reaction is electrolysis and the threshold voltage is 1.4 volts. The voltage of the DC signal may be 1.2 volts, and the highest peak voltage of the AC signal may be +100 mV. The pair of electrodes may comprise a porous material that sorbs the ions from the electrolyte. The DC signal and/or the AC signal may be applied to the electrodes by supplying the DC voltage signal and the AC voltage signal from at least one power supply to the pair of electrodes.

At block 310, the pair of electrodes may be subjected to the electrolyte. The electrodes may be subjected to the electrolyte by injecting the electrolyte into a channel that is disposed in between the pair of electrodes. At block 315, application of the DC signal from the pair of electrodes may be removed while application of the AC signal to the pair of electrodes may be maintained if a threshold value is met. The threshold value may be indicative of an amount of ions sorbed by electrodes. Alternatively, the threshold value may be indicative of a sorption rate of the ions being sorbed by the electrodes. At block 320, the charge stored in the electrodes may be drained from the electrodes. The charge may be drained after the DC signal is removed. In one example, the charge is drained by providing a short circuit between the electrodes. In another example, the charge is drained by providing a resistive circuit through which the charge may flow and be dissipated as heat.

Figure 4:
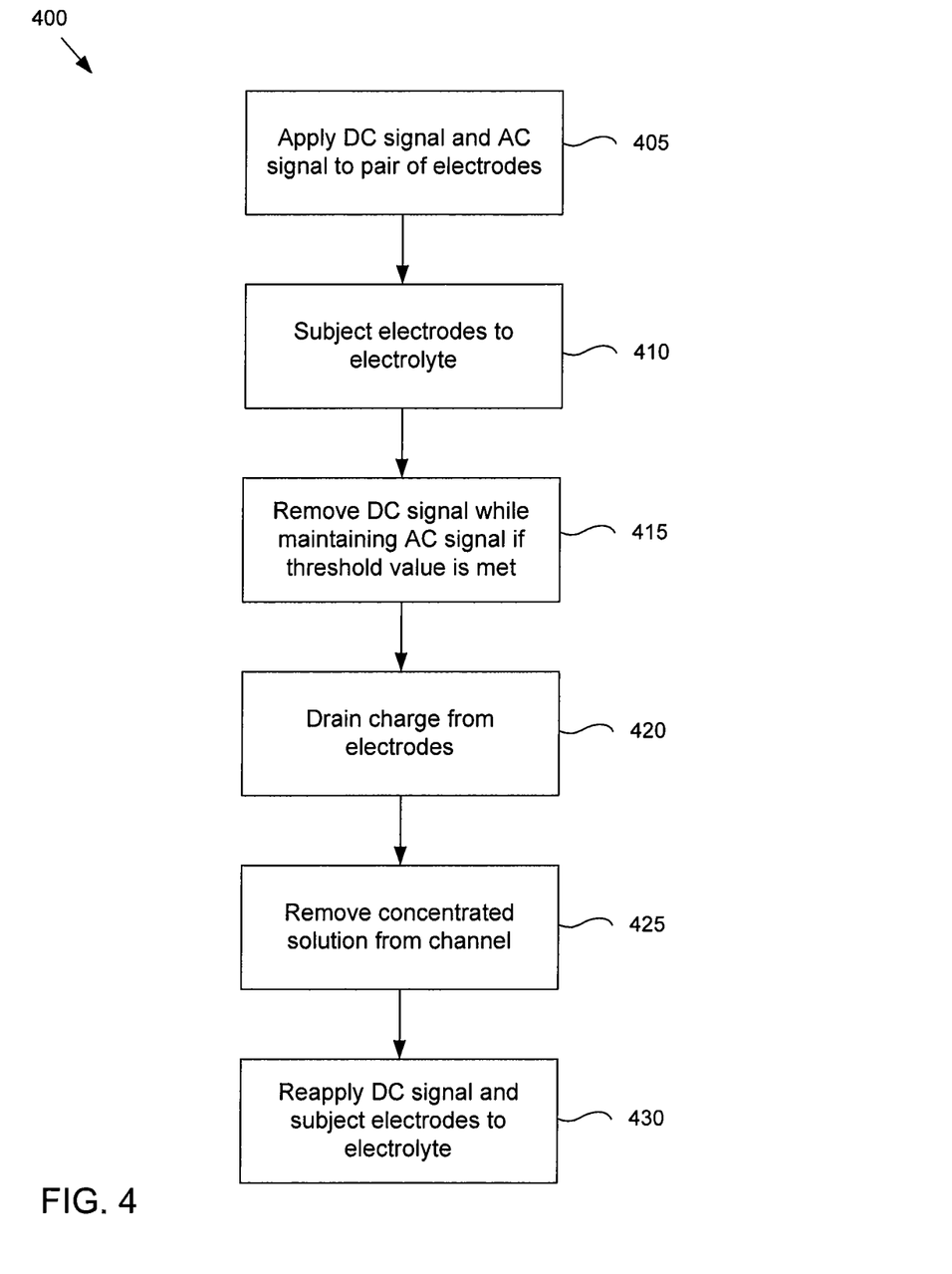
FIG. 4 shows an alternative example method 400 of applying an AC signal to electrodes during sorption and/or desorption of ions in an electrolyte system, where the electrolyte system comprises a capacitive deionization system.

FIG. 4 shows an alternative example method 400 of applying an AC signal to electrodes during sorption and/or desorption of ions in an electrolyte system, where the electrolyte system comprises a capacitive deionization system. At block 405, a DC signal and an AC signal are applied to a pair of electrodes. A sum of a voltage of the DC signal and a highest voltage of the AC voltage signal may be less than or equal to a threshold voltage of an electrochemical reaction associated with an electrolyte. In one example, the electrochemical reaction is electrolysis and the threshold voltage is 1.4 volts. The voltage of the DC signal may be 1.2 volts, and the highest peak voltage of the AC signal may be +100 mV. The pair of electrodes may comprise a porous material that sorbs the ions from the electrolyte. The DC signal and/or the AC signal may be applied to electrodes by supplying the DC voltage signal and the AC voltage signal from at least one power supply to the pair of electrodes. The DC signal and/or the AC signal may be applied to electrodes directly. Alternatively, the DC signal and/or the AC signal may be applied to a pair of current collector plates that are in electrical communication with the pair of electrodes.

At block 410, the pair of electrodes is subjected to the electrolyte. Subjecting the pair of electrodes to the electrolyte may include passing the electrolyte through a channel that is disposed in between the electrodes. The electrolyte may be passed through the channel by injecting the electrolyte into and/or removing the electrolyte out of the channel. Subjecting the pair of electrodes to the electrolyte may further include determining a flow rate at which to inject the electrolyte into the channel and/or remove the electrolyte from the channel, and injecting the electrolyte into the channel and/or removing the electrolyte from the channel at the flow rate. At block 415, application of the DC signal from the pair of electrodes may be removed while application of the AC signal to the pair of electrodes may be maintained if a threshold value is met. The threshold value may be indicative of an amount of ions sorbed by electrodes. Alternatively, the threshold value may be indicative of a sorption rate of the ions being sorbed by the electrodes. In addition, at block 415, the electrolyte may stop being injected into or removed from the channel. There may be an amount of the electrolyte that remains in the channel. When the DC signal is removed, ions sorbed in the electrodes may diffuse back into the electrolyte to form a concentrated solution in the channel.

At block 420, the charge stored in the electrodes may be drained from the electrodes. In one example, the charge is drained by providing a short circuit between the electrodes. In another example, the charge is drained by providing a resistive circuit through which the charge may flow and be dissipated as heat. At block 425, the concentrated solution may be removed from the channel. The concentrated solution may be sent to a storage location, such as a reservoir that is internal or external to the capacitive deionization system. The concentrated solution may be removed by pumping the concentrated solution out of the channel. At block 430, after the concentrated solution is removed from the channel, the DC signal may be reapplied to the pair of electrodes while application of the AC signal to the pair of electrodes is maintained. At block 435, the electrodes may be subjected to another electrolyte by passing the electrolyte through the channel.

Figure 5:
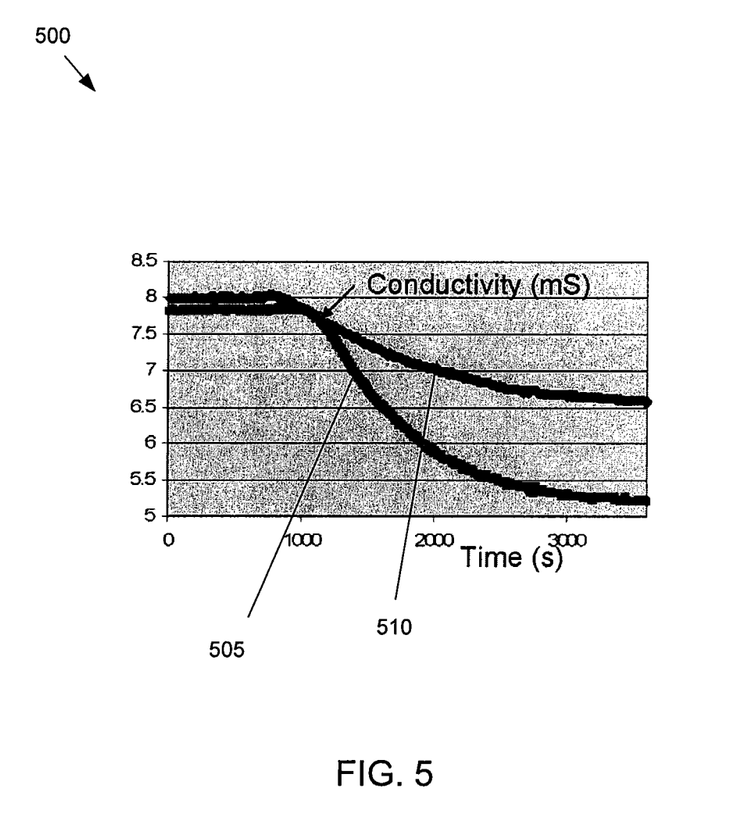
FIG. 5 shows a graph illustrating increased sorption rates when an AC signal and a DC signal are applied to electrodes, as compared to when only a DC signal is applied to the electrodes.

FIG. 5 shows a graph 500 of exemplary conductivity curves, illustrating increased sorption rates when an AC signal is applied to the electrodes of a reactor. The graph 500 shows measured conductivity of an aqueous solution flowing out of a capacitive deionization reactor, such as the capacitive deionization reactor 202 described with reference to FIG. 2. The electrodes comprised a mesoporous carbon material. A DC signal having a voltage of 1.2 volts and an AC signal having a peak-to-peak voltage of −100 mV to +100 mV were applied to the electrodes. In addition, the frequency of the AC signal was swept from 10 kHz to 100 kHz. Two conductivity curves are shown. A first curve 505 represents measured conductivity when the AC signal and the DC signal are applied to the electrodes. A second curve 510 represents measured conductivity when the AC is not applied to the electrodes, that is, when only the DC signal is applied to the electrodes. As shown in FIG. 5, when the conductivity is decreasing, the first curve 505 decreases at a rate that is faster than the rate at which the second curve 510 decreases. A similar curve may be generated that shows increased desorption rates, where the first curve 505 increases at a rate that is faster than the rate at which the second curve 510 increases. Table 1 indicates the improvement in sorption and desorption rates that may result when the AC signal is applied to the electrodes.

TABLE 1

|  | Sorption Rate (ppm/1000 s) | Desorption Rate (ppm/1000 s) |
| --- | --- | --- |
| Without AC | 579 | 287 |
| With AC | 1339 | 571 |
| Change | +131% | +99% |

Based on the conductivity measurements and the rates at which the conductivity increased and/or decreased, application of the AC signal may increase the sorption rate of ions by 131% and may increase the desorption rate of ions by 99%. Lowering the peak-to-peak voltage may diminish the improvement in sorption and/or desorption rates. For example, decreasing the peak-to-peak voltage to −10 mV to +10 mV may improve the sorption rate by 33% and may improve the desorption rate by 84%.

In addition, application of the AC signal may improve the capacity of the electrodes to sorb the ions. The improved capacity may be determined by measuring the conductivity of the aqueous solution flowing out of the capacitive deionization reactor at steady state (i.e., a state in which a drop in conductivity occurs when equilibrium has been reached and the charge of the electrodes is counterbalanced by the ions). For example, when the AC signal is applied, the measured conductivity of the aqueous solution flowing out of the capacitive deionization reactor 202 at steady state may increase as compared to when only the DC signal is applied. In one example, when the AC signal is applied, the drop in conductivity at steady state may improve by 78%.

Various embodiments described herein can be used alone or in combination with one another. The foregoing detailed description has described only a few of the many possible implementations of the present invention. For this reason, this detailed description is intended by way of illustration, and not by way of limitation.

What is claimed is:

1. An electrolyte system comprising:
   a reactor comprising:
      a pair of electrodes; and
      a channel in between the pair of electrodes, an electrolyte being disposed in the channel,
   wherein the pair of electrodes are configured to:
      receive a direct current (DC) signal and an alternating current (AC) signal for sorption of ions in the electrolyte by the pair of electrodes;
      sorb the ions in the electrolyte in response to receipt of the DC signal and the AC signal;
      receive the AC signal without receipt of the DC signal for desorption of the ions in the electrolyte by the pair of electrodes; and
      desorb the ions that were sorbed in response to receipt of the AC signal without the DC signal;
   at least one power supply in electrical communication with the reactor and configured to:
      supply the DC signal and the AC signal to the pair of electrodes for the sorption of the ions in the electrolyte;
      switch from being configured to supply the DC signal and the AC signal to being configured to supply the AC signal without the DC signal to the pair of electrodes for the desorption of the ions that were sorbed by the pair of electrodes; and
      supply the AC signal without supply of the DC signal to the pair of electrodes for the desorption of the ions in the electrolyte; and
   a controller in electrical communication with the at least one power supply and configured to:
      cause the at least one power supply to supply the DC signal and the AC signal to the pair of electrodes while determining an amount of ions sorbed by the pair of electrodes;
      determine that the amount of ions sorbed by the pair of electrodes has reached a threshold level; and
      in response to the determination, cause the at least one power supply to turn off the supply of the DC signal while keeping on the supply of the AC signal to the pair of electrodes for the desorption of the ions.

2. The electrolyte system of claim 1, wherein a sum of a voltage of the DC signal and a highest voltage of the AC signal is less than or equal to a threshold voltage of an electrochemical reaction associated with the electrolyte.

3. The electrolyte system of claim 2, wherein the electrochemical reaction is electrolysis, and wherein the threshold voltage is about +1.4 volts.

4. The electrolyte system of claim 1, wherein a sum of a voltage of the DC signal and a highest voltage of the AC signal is greater than a threshold voltage of an electrochemical reaction associated with the electrolyte.

5. The electrolyte system of claim 1, wherein a voltage of the DC signal is about +1.2 volts and a highest voltage of the AC signal is about +100 mV.

6. The electrolyte system of claim 1, further comprising a pump that is connected to the reactor, the pump being configured to pump the electrolyte into and out of the reactor.

7. The electrolyte system of claim 1, further comprising a charge drainage module connected to the reactor, the charge drainage module being configured to remove charge from the pair of electrodes.

8. The electrolyte system of claim 7, wherein the charge drainage module is configured to remove charge from the pair of electrodes when the at least one power supply is supplying only the AC signal to the pair of electrodes.

* * * * *